Jan. 11, 1972 — W. LEHNERER ET AL — 3,634,381
DEGRADATION OF HIGH MOLECULAR WEIGHT
POLYISOBUTYLENE IN EXTRUDERS
Filed April 23, 1969
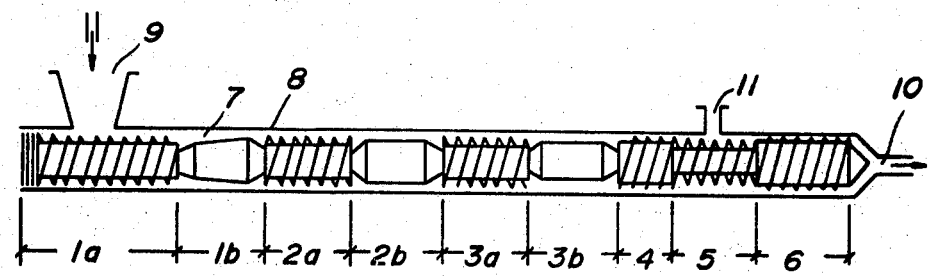
INVENTORS
WOLFGANG LEHNERER
HERMANN GUETERBOCK
KLAUS KINKEL United States Patent Office 3,634,381
Patented Jan. 11, 1972

3,634,381
DEGRADATION OF HIGH MOLECULAR WEIGHT POLYISOBUTYLENE IN EXTRUDERS
Wolfgang Lehnerer, Frankenthal, Hermann Gueterbock, Friedelsheim, and Klaus Kinkel, Rodenkirchen, Germany, assignors to Badische Anilin- & Soda-Fabrik AG, Ludwigshafen (Rhine), Germany
Filed Apr. 23, 1969, Ser. No. 818,752
Claims priority, application Germany, Apr. 27, 1968, P 17 70 295.3
Int. Cl. C08f 3/14
U.S. Cl. 260—94.8          7 Claims

ABSTRACT OF THE DISCLOSURE

A process and apparatus for the degradation of high molecular weight polyisobutylene in a screw extruder provided with a screw spindle by the action of shearing forces in three degradation zones connected by conveying zones, the polyisobutylene being exposed, as it is conveyed from degradation zone to degradation zone, to temperatures alternating between 150° and 350° C. and to alternating shearing forces which result from velocity gradients of from about 100 to about 700 sec.$^{-1}$ maintained between the shearing surfaces of the wall of the barrel and the screw which are moving in relation to one another.

---

This invention relates to a process and apparatus for the degradation of high molecular weight polyisobutylene in extruders by the action of shearing forces in three degradation zones (connected by conveying zones) each of which consists in a narrow gap formed by two axially symmetrical surfaces moving in relation to one another about a common axis.

It is known that polyisobutylene can be degraded by the action of shearing forces. Thus according to U.K. patent specification No. 716,706, polyisobutylene can be degraded in rubber calenders at elevated temperature. According to another method (Belgian patent specification No. 696,619) heat-stabilized polymers can be degraded in a single-screw extruder in which a shear gradient is produced having a velocity gradient of less than 1500/second. The shear gradient is advantageously produced at a friction roller provided on the screw spindle. The use of such friction rollers has also been proposed (German Pat. No. 1,167,009) for the processing under mild conditions of plastics which are to be mixed with additives.

In order to steer polyisobutylene degradation according to the said methods toward definite end products it is either necessary to allow the degradation to proceed very slowly or to maintain definite degradation conditions very accurately. Thus small fluctuations in the temperature of the barrel of the extruder may result in considerable fluctuations in the degree of degradation. Nonuniform metering of the product may also easily change the degradation behaviour. It is only with difficulty that such fluctuations can be prevented in continuous operation. Uniform feed of product is made particularly difficult because high molecular weight polyisobutylene can only be added in the form of irregular strips and cuttings because of its rubbery nature and its tendency to stick.

The present invention solves the problem of degrading high molecular weight polyisobutylene in an extruder under the action of a shear gradient and of achieving a uniform degree of degradation (i.e. a uniform end product) even in the event of slight fluctuations in the temperature of the barrel or in the feed of product.

This uniform degradation is achieved by means of a process using an extruder provided with three degradation zones formed by axially symmetrical surfaces whereby in a shear gradient having a velocity gradient of from 100 to 300 seconds$^{-1}$ is maintained in the first zone at a temperature of from 200° to 280° C., a shear gradient having a velocity gradient of from 300 to 700 seconds$^{-1}$ is maintained in the second zone at a temperature of from 250° to 350° C. and a shear gradient having a lower velocity gradient than in the second zone is maintained in the third zone at a temperature of from 150° to 350° C.

Apparatus for the degradation of high molecular weight polyisobutylene comprises a barrel and a screw spindle provided with several threaded and several unthreaded sections and according to this invention the screw spindle has three unthreaded sections formed as friction rollers with smooth surfaces and arranged between the threaded sections, the distance between the friction roller and the barrel in the first section being at least one and a half times and not more than four times the distance between the second friction roller and the barrel in the second section, and the diameter of the friction roller in the third section being less than that of the friction roller in the second section.

The starting material for the degradation may be high molecular weight polyisobutylene which has been prepared by a conventional method and which has a molecular weight (viscosity mean $\overline{M}_v$, derived from the relationship $[\eta] = 3.06 \times 10^{-4} \times \overline{M}_v^{0.65}$) of more than 1,000,000. This polyisobutylene may be comminuted in a granulating and cutting machine into loosely adhering strips or chips. It is supplied to the degrading machine in this form.

Degradation by means of shearing forces is carried out in accordance with this invention in two stages. After the crude product has been introduced into the machine it passes through the first feed zone whose length is about 3D (D being its diameter). It then reaches the first friction zone with a spindle section whose outer surface is cylindrical or slightly conical in shape and which acts as a friction roller. The distance between the outer surface of the friction roller and the wall of the barrel (clearance) is such that under the operating conditions degradation takes place without the molecular weight falling below about 300,000. The product which is now viscous is passed through a second feed zone having a length of about 3D into a second friction zone having a friction roller whose distance from the extruder barrel is according to the invention from 1.5 to 4 times smaller than that in the first friction zone. In this second friction zone, the product is more strongly degraded down to a molecular weight of from about 50,000 to 100,000. The product which is now liquid is conveyed through a third feed zone (again having a length of about 3D) to a third friction zone having a friction roller whose outer surface is either at the same distance (clearance) from the extruder barrel as the second friction roller or at a greater distance (clearance) from the extruder barrel than the second friction roller. This third friction roller homogenizes the degraded product. The length of the friction rollers is advantageously from about 2D to 4D.

The extruder barrel should be provided with heating zones and cooling zones for carrying out the process according to the invention.

The sections of the extruder barrel in the region of the friction rollers are advantageously kept at about the temperature set up in the product by frictional heat. In the first friction zone the temperature is kept at from about 240° to 280° C. and in the second friction zone from about 290° to 330° C. In the feed zone following the second friction zone, further degradation can be achieved by a high temperature. It is however also possible to carry out cooling in this region, in which case there is no further degradation. The extruder barrel is advantageously cooled at the feeder and the extruder head. In the procedure described, the temperature may fluctuate slightly without the degree of degradation changing noticeably. Thus fluctuations of ±10° C. in the temperature of the barrel have no appreciable influence on the degradation.

The length of the screw should advantageously be such that downstream of the degradation and homogenization zones there is still room for a cooling zone. Screw lengths of from 27D to 32D are arrived at in this way. A cooling zone is found to be advantageous in order to cool the degraded product to such an extent that further degradation cannot take place. The temperature of the product discharged should be below 270° C.

A degassing zone (in which the gaseous and low boiling point products which have been formed during the degradation can be removed) may be provided in known manner following the third friction zone.

The new process makes it possible to degrade high molecular weight polyisobutylene continuously, with a high throughput, uniformly and reproducibly to molecular weights $\overline{M}_v$ of less than 200,000. The process makes degradation substantially independent of accidental fluctuations in temperature and in the residence time of the product such as may always occur in the course of a continuous process. The solution viscosities of the low molecular weight polyisobutylenes obtained by the process vary in continuous operation by not more than 5% with reference to the desired value.

The drawing illustrates diagrammatically by way of example a screw extruder in accordance with the invention which has six zones. A screw 7 having a length of 28D (D=120 mm.) is used which is rotatable in a barrel 8. The screw 7 comprises the following zones in the direction from the feed hopper 9 to the extruder head 10:

Zone 1

1a: feed zone: length 625 mm., depth of screw channel 10.2 mm., lead of screw flight 120 mm.;
1b: conical friction zone; diameter of friction roller at the beginning 111.4 mm., at the end 114.8 mm.;

Zone 2

2a: feed zone: length 360 mm. (otherwise like 1a);
2b: cyclindrical friction zone; diameter of friction roller 117 mm.;

Zone 3

3a: feed zone like 2a;
3b: cyclindrical friction zone; diameter 115 mm.;

Zone 4 feed zone; length 214 mm.; depth of screw channel 5.4 mm.;

Zone 5 degassing zone: length 340 mm.; depth of screw channel 15.15 mm.;

Zone 6 feed zone; length 380 mm.; depth of screw channel 5.15 mm.

The extruder head 10 contains an extrusion die having a diameter of for example 20 mm. The degassing zone 5 is provided with a degassing pipe 11. The output of the screw is determined by the diameter of the screw spindle and that of the second friction roller, the depth and lead of the screwthread and the speed of rotation of the screw. The limit of the output generally lies at a point where the heat exchange between the product and its environment is no longer uniform. The appropriate speed of rotation has to be determined in accordance with the size of the extruder and the desired degree of degradation. If the permissible value is exceeded, degradation proceeds irregularly. In this case nodular swollen material which has a higher molecular weight is found in the degraded product. It is characteristic of the process described that the said limits are very wide. Thus for example with a screw extruder having a screw diameter of 120 mm., 100 kg. of polyisobutylene per hour can be degraded without difficulty from a molecular weight $\overline{M}_v$ of 4,700,000 to $\overline{M}_v=$ 95,000. The limiting value for the peripheral speed of the screw in this case is about 90 cm./second.

Further details of the process according to this invention are given in the following example.

EXAMPLE

Degradation of polyisobutylene is to be carried out in a single-screw extruder shown diagrammatically in the drawing and having the dimensions given above.

The temperatures of the extruder barrel during operation are as follows: Zone 1a at about 250° C.; friction zone 1b at about 280° C.; friction zone 2b at about 313° C.; friction zone 3b at about 310° C.

Zones 5 and 6 and the extruder head 10 are air-cooled.

High molecular weight polyisobutylene having a molecular weight of $\overline{M}_v=4,700,000$ serves as the starting material. It is fed into the extruder in the form of strips having a length of 10 cm. The degraded end product is discharged into drums through an outlet pipe connected to the extruder head.

1.72 metric tons per day is processed under the said conditions at a rotational speed of the screw of 100 r.p.m. The degraded product obtained is uniform and has molecular weights of from 49,000 to 51,000; it is clear and free from foam. The temperature at discharge is about 265° C. 0.7% of the amount of polyisobutylene fed in is recovered as readily volatile degradation products in the degassing. In order to keep the temperatures accurately constant in the individual zones, a number of heating or cooling means with temperature measuring points are provided side-by-side on the barrel in known manner.

We claim:

1. A process for the degradation of high molecular weight polyisobutylene by the action of shear forces in three degradation zones connected by feed zones, each degradation zone having a narrow gap formed between two concentric symmetrical surfaces rotated relatively to each other about a common axis, wherein a shear gradient with a velocity gradient of from 100 to 300 seconds$^{-1}$ is maintained in the first degradation zone at a temperature of from 200° to 280° C., a shear gradient with a velocity gradient of from 300 to 700 seconds$^{-1}$ is maintained in the second degradation zone at a temperature of from 250° to 350° C., and a shear gradient with a velocity gradient lower than that in the second zone is maintained in the third degradation zone at a temperature of from 150° to 350° C.

2. A process as claimed in claim 1 wherein the polyisobutylene used as starting material has a molecular weight $\overline{M}_v$ of more than 1,000,000.

3. A process as claimed in claim 1 wherein a cooling zone is provided downstream of the third degradation zone.

4. A process as claimed in claim 1 wherein a degassing zone is provided downstream of the third degradation zone.

5. A process as claimed in claim 1 wherein said polyisobutylene is fed longitudinally through a tubular member having said degradation zones and said feed zones therein, each respective degradation zone being formed by a narrow clearance between the inner wall of said tubular member and a roller having its axis of rotation common with the axis of said tubular member, and the clearance between each roller and said tubular member providing the respective narrow gaps of said degradation zones.

6. A process as claimed in claim 5 wherein the distance between the roller and said tubular member in the first degradation zone is at least one and one-half times to four times the distance between the roller and said tubular member in said second degradation zone.

7. A process as claimed in claim 6 wherein the length of said rollers in said respective degradation zones is about two to four times the diameter of said zones.

References Cited

UNITED STATES PATENTS 3,144,436  8/1964  Greene et al. _____ 260—93.7
3,412,080  11/1968  Smith et al. _____ 260—94.9

JOSEPH L. SCHOFER, Primary Examiner
R. A. GAITHER, Assistant Examiner

U.S. Cl. X.R.

18—12